United States Patent
Inoue et al.

(10) Patent No.: US 11,440,114 B2
(45) Date of Patent: Sep. 13, 2022

(54) WIRE ELECTRIC DISCHARGE MACHINING METHOD AND WIRE ELECTRIC DISCHARGE MACHINE

(71) Applicant: SODICK CO., LTD., Kanagawa (JP)

(72) Inventors: Hirotoshi Inoue, Kanagawa (JP); Masashi Sakaguchi, Kanagawa (JP)

(73) Assignee: SODICK CO., LTD., Kanagawa (JP)

( * ) Notice: Subject to any disclaimer, the term of this patent is extended or adjusted under 35 U.S.C. 154(b) by 274 days.

(21) Appl. No.: 15/931,575

(22) Filed: May 13, 2020

(65) Prior Publication Data

US 2020/0368837 A1    Nov. 26, 2020

(30) Foreign Application Priority Data

May 24, 2019 (JP) ................. JP2019-097688
Feb. 4, 2020 (JP) ................. JP2020-016674

(51) Int. Cl.
| | |
|---|---|
| *B23H 7/10* | (2006.01) |
| *B23H 1/02* | (2006.01) |
| *B23H 1/08* | (2006.01) |
| *B23H 1/10* | (2006.01) |
| *B23H 7/26* | (2006.01) |
| *B23H 7/06* | (2006.01) |

(52) U.S. Cl.
CPC ............ *B23H 7/104* (2013.01); *B23H 1/024* (2013.01); *B23H 1/08* (2013.01); *B23H 1/10* (2013.01); *B23H 7/06* (2013.01); *B23H 7/105* (2013.01); *B23H 7/26* (2013.01)

(58) Field of Classification Search
CPC .......... B23H 7/104; B23H 7/105; B23H 7/10; B23H 7/26; B23H 7/106; B23H 7/06
See application file for complete search history.

(56) References Cited

U.S. PATENT DOCUMENTS

| | | | | |
|---|---|---|---|---|
| 3,731,044 | A * | 5/1973 | Ullmann ................. | B23H 7/06 219/69.12 |
| 3,830,996 | A * | 8/1974 | Ullmann ................. | B23H 7/06 219/69.12 |
| 10,010,957 | B2 * | 7/2018 | Inoue ..................... | B23H 1/10 |
| 2016/0023921 | A1 * | 1/2016 | Addiego ................. | B01J 20/3236 252/178 |

FOREIGN PATENT DOCUMENTS

| | | |
|---|---|---|
| JP | S5645324 | 4/1981 |
| JP | 58109228 | 6/1983 |

(Continued)

OTHER PUBLICATIONS

Machine translation of Japan Patent Document No. 03-026421 A, Apr. 2022 (Year: 2022).*

(Continued)

*Primary Examiner* — Geoffrey S Evans
(74) *Attorney, Agent, or Firm* — JCIPRNET

(57) ABSTRACT

The disclosure provides a wire electric discharge machine which has a simple configuration and can make a wire electrode fed to a machining position rotate around an axis. The wire electric discharge machine for machining a workpiece includes an upper wire guide and a lower wire guide, which stretch a wire electrode therebetween, and a rotator. A position of the rotator is changed, whereby the wire electrode is rotated around an axis.

11 Claims, 16 Drawing Sheets

(56) References Cited

FOREIGN PATENT DOCUMENTS

| JP | 62157726 A | * | 7/1987 | | |
|---|---|---|---|---|---|
| JP | S62157726 | | 7/1987 | | |
| JP | S62174830 | | 11/1987 | | |
| JP | 1321126 A | * | 12/1989 | | |
| JP | H0246326 | | 2/1990 | | |
| JP | H0246326 | | 10/1990 | | |
| JP | 03026421 A | * | 2/1991 | ............... | B23H 7/10 |
| JP | H04343619 | | 11/1992 | | |
| JP | 08294825 A | * | 11/1996 | | |
| JP | H08294825 | | 11/1996 | | |
| JP | 2012121087 | | 6/2012 | | |

OTHER PUBLICATIONS

Machine translation of Japan Patent Document No. 08-294,825A, Apr. 2022 (Year: 2022).*
Office Action of Taiwan Counterpart Application, with English translation thereof, dated Nov. 24, 2020, pp. 1-11.
"Office Action of Japan Counterpart Application", dated Aug. 4, 2020, with English translation thereof, p. 1-p. 6.
"Search Report of Europe Counterpart Application", dated Oct. 16, 2929, p. 1-p. 7.

\* cited by examiner

WIRE ELECTRIC DISCHARGE MACHINING METHOD AND WIRE ELECTRIC DISCHARGE MACHINE

CROSS-REFERENCE TO RELATED APPLICATION

This application claims the priority benefit of Japan application serial no. 2019-097688, filed on May 24, 2019 and Japan application serial no. 2020-016674, filed on Feb. 4, 2020. The entirety of the above-mentioned patent applications is hereby incorporated by reference herein and made a part of this specification.

BACKGROUND

Technical Field

The disclosure relates to a wire electric discharge machine and a wire electric discharge machining method.

Description of Related Art

Conventionally, as disclosed in Patent Documents 1 and 2, for example, a wire electric discharge machine that machines a workpiece using a wire electrode is known. This type of wire electric discharge machine is usually configured to make a wire electrode under tension in the longitudinal direction move with respect to a workpiece in the longitudinal direction and at the same time generate a discharge in a machining gap formed between the peripheral surface of the wire electrode and the workpiece, so as to machine the workpiece into a predetermined shape by removing a part of the workpiece.

In the above-described wire electric discharge machine, the wire electrode is generally fed from the upper surface to the lower surface of the workpiece, but the wire electrode is consumed by the discharge phenomenon. In particular, in the vicinity of the lower surface of the workpiece, since the wire electrode that has been consumed by machining the part further to the upper surface side is fed, the machining surface quality deteriorates due to the discharge trace transfer of the wire electrode surface, and the machining dimensional accuracy deteriorates.

Specifically, since the wire electrode becomes thinner due to consumption as it approaches the lower surface of the workpiece, a problem occurs that the workpiece is tapered due to deviation from the preset machining surface. As the wire electrode becomes thinner, it becomes necessary to additionally perform taper correction for bringing the wire electrode closer to the workpiece only on the lower surface side.

Furthermore, since the consumption of the wire electrode is concentrated on one electrode side, that is, the electrode side facing the machining surface, it also causes disconnection.

RELATED ART

Patent Document

[Patent Document 1] Japanese Laid-open No. S62-157726
[Patent Document 2] Japanese Publication No. H2-46326

SUMMARY

In order to cope with the consumption of the wire electrode as described above, it has been conventionally known that a wire electrode fed to a machining position is rotated around an axis as shown in Patent Documents 1 and 2. However, the conventional means of rotating the wire electrode is complicated in that a pair of rollers clamping the wire electrode move to and fro in the axial direction in directions opposite to each other, or the wire electrode feeding device is rotated as a whole. Therefore, the size of the wire electric discharge machine is increased, and the cost is increased significantly. Further, conventionally, no machining method has been proposed that can more effectively prevent the deterioration of the machining surface quality and the deterioration of the machining dimensional accuracy in the case where the wire electrode is rotated around the axis as described above.

The disclosure has been made in consideration of the above circumstances, and the disclosure provides a wire electric discharge machine which has a simple configuration and can make a wire electrode fed to a machining position rotate around an axis. The disclosure further provides a wire electric discharge machining method that can more effectively prevent the deterioration of the machining surface quality and the deterioration of the machining dimensional accuracy in the case where the wire electrode is rotated around the axis.

A wire electric discharge machine of the disclosure includes an upper wire guide and a lower wire guide that stretch a wire electrode therebetween and a rotator that changes a feed direction of the wire electrode, the wire electric discharge machine being configured for machining a workpiece placed between the upper wire guide and the lower wire guide by generating a discharge between the workpiece and the wire electrode, wherein a rotation axis of the rotator is disposed so as to be perpendicular to a straight line connecting the upper wire guide and the lower wire guide, and the rotator is disposed at a position deviated from the straight line connecting the upper wire guide and the lower wire guide in a rotation axis direction of the rotator, whereby the wire electrode is rotated around an axis.

Generally, the outer peripheral surface of the rotator that contacts the wire electrode is disposed on the same straight line connecting the upper wire guide and the lower wire guide. The disclosure can easily make the wire electrode rotate around the axis by disposing the rotator deviated from the same straight line connecting the upper wire guide and the lower wire guide. Therefore, it is possible to avoid an increase in the size of the machine and a significant increase in cost for providing the rotation.

Further, since the workpiece is machined while the wire electrode is rotating around the axis, the wire electrode always machines the workpiece by a new surface, so additional processing such as taper correction is not required.

In the wire electric discharge machine of the disclosure, the rotator includes a winding part around which the wire electrode is wound and large diameter parts disposed at two ends of the winding part, wherein a cross section of the outer circumference of the winding part is formed in an arc shape.

According to the disclosure, since the cross section of the outer circumference of the winding part is formed in an arc shape, the rotator is deviated from the straight line connecting the upper wire guide and the lower wire guide in the rotation axis direction of the rotator, whereby a force for rotating the wire electrode toward the axial-direction center position of the rotator is generated, and rotation around the axis can be provided.

In the wire electric discharge machine of the disclosure, the wire electrode is disposed on an outer peripheral surface of the rotator to be inclined within a range of 0.1 to 1.0°

(degrees) with respect to a direction orthogonal to the rotation axis direction of the rotator.

Further, in the wire electric discharge machine of the disclosure, the perpendicular line of the rotation axis of the rotator is disposed to be inclined within a range of 0.1 to 1.0° (degrees) with respect to the straight line connecting the upper wire guide and the lower wire guide When a workpiece is machined in a wire electric discharge machine, it is desirable that the wire electrode always machines by a new surface. At the time of machining, if the wire electrode rotates one or more turns around the axis from the front surface of the workpiece to the back surface of the workpiece, which is the machining end position, the workpiece is machined by a consumed surface of the wire electrode. Therefore, the inclination angle of the wire electrode with respect to the traveling direction of the rotator is set so that the wire electrode rotates ¼ to 1 turn from the front surface of the workpiece, which is the machining start position at a certain point of the wire electrode, to the back surface of the workpiece, which is the machining end position, and the inclination angle is preferably in the range of 0.1 to 1.0° (degrees).

The wire electric discharge machine of the disclosure further includes a control device and a rotator unit that incorporates the rotator, wherein the rotator unit switches, according to a command from the control device, the rotator at three positions including a left position and a right position with respect to the straight line connecting the upper wire guide and the lower wire guide, and a center position on the straight line, thereby changing rotation/non-rotation and a rotation direction of the wire electrode.

In addition, the disclosure provides a wire electric discharge machining method for machining a workpiece by generating a discharge between the workpiece and a wire electrode rotating around an axis, wherein as viewed from an upstream side in a feed direction of the wire electrode, when a machining surface of the workpiece is on a right side in a machining advancing direction, a rotation direction of the wire electrode around the axis is set to be counterclockwise, and as viewed from the upstream side in the feed direction of the wire electrode, when a machining surface of the workpiece is on a left side in the machining advancing direction, the rotation direction of the wire electrode around the axis is set to be clockwise.

In order to always machine a workpiece with an unconsumed wire electrode, it is necessary to change the rotation direction of the wire electrode according to the positional relationship between the machining advancing direction of the wire electrode and the machining reference surface of the workpiece. According to the disclosure, the rotator is switched at the three positions including the left position and the right position with respect to the straight line connecting the upper wire guide and the lower wire guide, and the center position on the straight line, whereby the rotation/non-rotation and the rotation direction of the wire electrode are changed. Therefore, workpieces of various shapes and machining programs can be processed, and uniform dimensional accuracy of workpieces can be achieved.

In the wire electric discharge machine of the disclosure, the control device determines a position of the rotator based on information of a machining program of the wire electric discharge machine.

According to disclosure, since it is possible to automatically determine and set the position of the rotator (the rotation direction of the wire electrode around the axis) based on the information of the machining program, the operator does not consider the rotation direction of the wire electrode.

The disclosure provides a wire electric discharge machine including an upper wire guide and a lower wire guide that stretch a wire electrode therebetween and a rotator that changes a feed direction of the wire electrode, the wire electric discharge machine being configured for machining a workpiece placed between the upper wire guide and the lower wire guide by generating a discharge between the workpiece and the wire electrode, wherein the rotator is disposed so that a perpendicular line of a rotation axis of the rotator is inclined with respect to a straight line connecting the upper wire guide and the lower wire guide, and the wire electrode is disposed on an outer peripheral surface of the rotator, whereby the wire electrode is rotated around an axis.

Further, in the wire electric discharge machine of the disclosure, the rotator includes a winding part around which the wire electrode is wound and large diameter parts disposed at two ends of the winding part, wherein the winding part is formed in a circular columnar shape.

Generally, the rotation axis of the rotator is disposed to be perpendicular to the straight line connecting the upper wire guide and the lower wire guide. The disclosure can easily make the wire electrode rotate around the axis by disposing the perpendicular line of the rotation axis of the rotator to be inclined with respect to the straight line connecting the upper wire guide and the lower wire guide. Therefore, it is possible to reduce the size of the machine and to reduce equipment costs.

The disclosure provides a wire electric discharge machine including an upper wire guide and a lower wire guide that stretch a wire electrode therebetween and a pair of rotators that are disposed to clamp the wire electrode, the wire electric discharge machine being configured for machining a workpiece placed between the upper wire guide and the lower wire guide by generating a discharge between the workpiece and the wire electrode, wherein the pair of rotators are disposed so that perpendicular lines of rotation axes of the rotators are each inclined with respect to a straight line connecting the upper wire guide and the lower wire guide, whereby the wire electrode is rotated around an axis.

According to the disclosure, a pair of rotators disposed to clamp the wire electrode are used, and the pair of rotators are disposed so that the perpendicular lines of the rotation axes of the rotators are each inclined with respect to the straight line connecting the upper wire guide and the lower wire guide, whereby it is possible to make the wire electrode rotate around the axis easily.

The wire electric discharge machine according to the disclosure can rotate the wire electrode around the axis simply by setting the rotator generally provided in the traveling system of the wire electrode to a disposition state different from the usual one, and therefore can be formed without increasing the size and increasing the cost significantly for providing the rotation.

Further, according to the wire electric discharge machining method of the disclosure, the rotation direction of the wire electrode around the axis is defined as described above in accordance with the positional relationship between the machining advancing direction and the machining surface, whereby electric discharge machining can be performed with the unconsumed surface of the wire electrode with gentle rotation and good efficiency. Therefore, high machining surface quality and machining dimensional accuracy can be realized, and no additional correction is required. This effect is particularly beneficial if the wire electric discharge machining method according to the disclosure is applied to finishing machining of a workpiece after rough machining.

DESCRIPTION OF THE EMBODIMENTS

First Embodiment of the Disclosure

Figure 1:
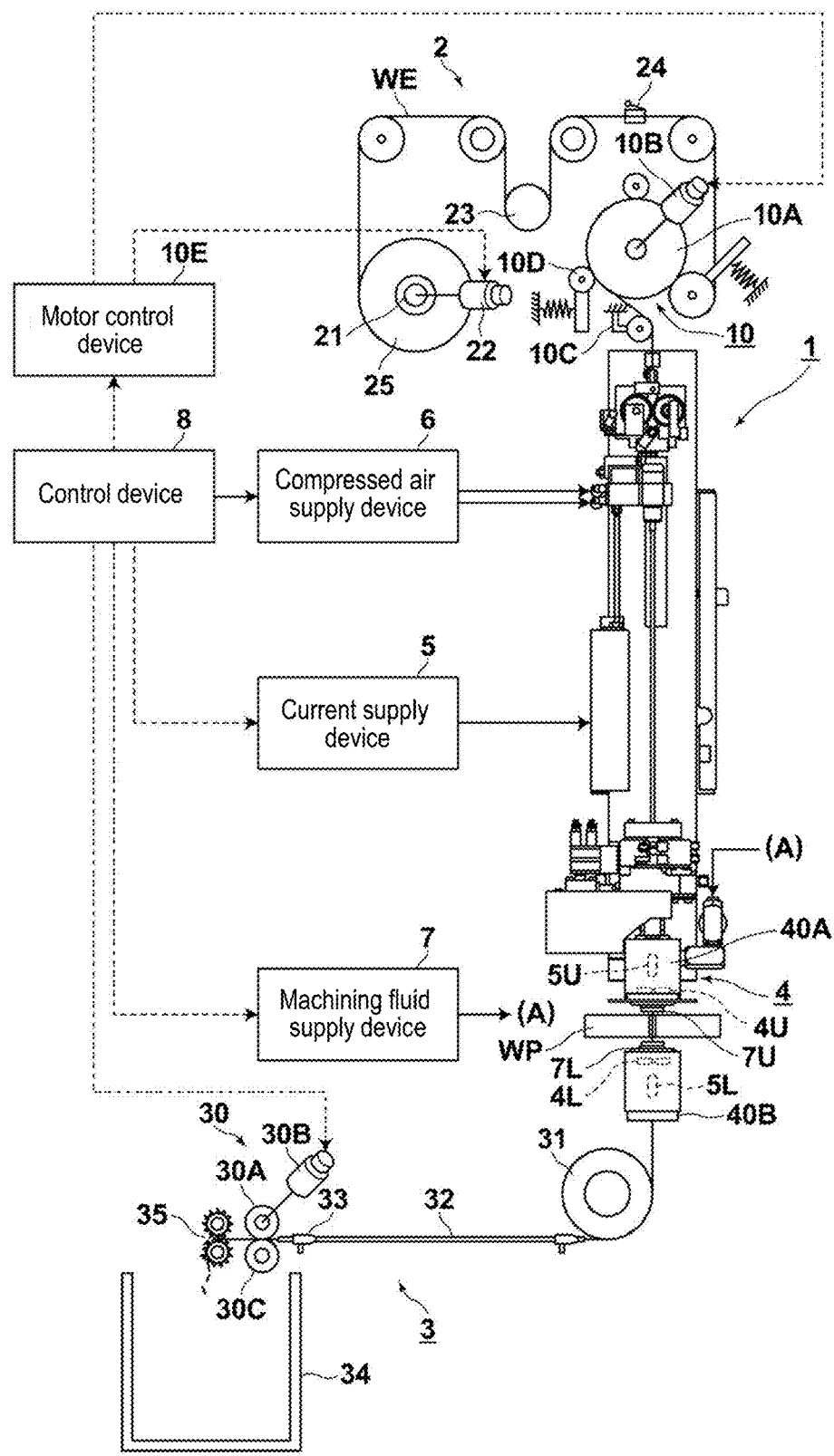
FIG. 1 is a schematic side view showing a wire electric discharge machine 100 according to a first embodiment of the disclosure.
Figure 2:
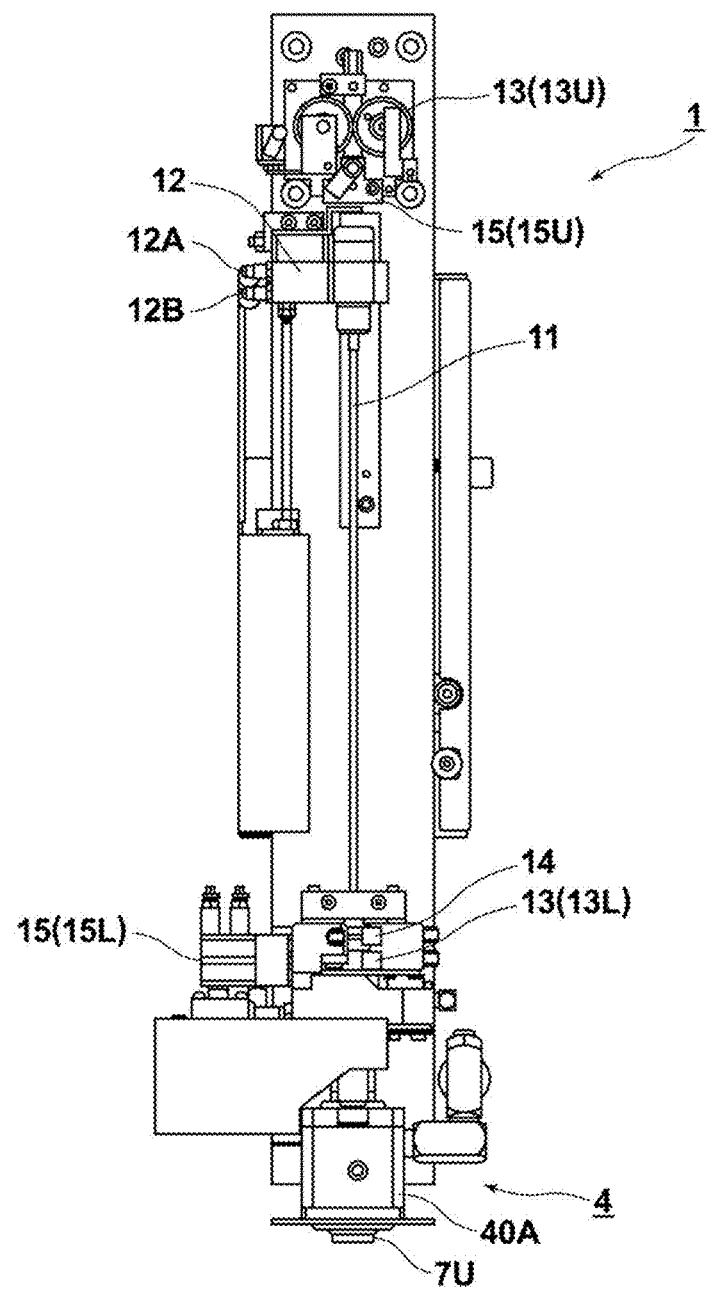
FIG. 2 is a side view showing an automatic connection device 1 in the wire electric discharge machine 100 of the embodiment.

Hereinafter, embodiments of the disclosure will be described with reference to the drawings. FIG. 1 shows a first embodiment of a wire electric discharge machine 100 according to the disclosure. FIG. 1 schematically shows the wire electric discharge machine 100 so that a defined traveling path of a wire electrode can be understood. In FIG. 1, an automatic connection device 1, a wire feeding mechanism, and a wire guide mechanism are shown as viewed from the front of the machine, and a wire collecting mechanism is shown as viewed from the side of the machine. Hereinafter, the configuration of the wire electric discharge machine 100 according to the embodiment will be described with reference to FIG. 1 and FIG. 2.

A wire electrode WE and a workpiece WP are disposed opposite to each other so that a predetermined machining gap is formed between the wire electrode WE and the workpiece WP. The wire electrode WE and the workpiece WP relatively move in any direction on a horizontal plane by a moving device (not shown). A what is called a taper device for inclining the wire electrode WE with respect to the workpiece WP is not shown.

The wire electric discharge machine 100 includes the automatic connection device 1, a wire feeding mechanism 2, a wire collecting mechanism 3, a wire guide mechanism 4, a current supply device 5, a compressed air supply device 6, a machining fluid supply device 7, and a control device 8. The wire electrode WE is stretched between a pair of wire guides 4U and 4L, which are provided so as to clamp the workpiece WP, with a predetermined tension applied along a defined traveling path.

The automatic connection device 1 is a device for automatically stretching the wire electrode WE between the pair of wire guides 4U and 4L by inserting the tip of the wire electrode WE into a pilot hole. The automatic connection device 1 includes at least a guide pipe 11, a wire vibration device 12, annealing electrodes 13, an intermediate power supply electrode 14, and an electrode driving device 15, as shown in detail in FIG. 2.

The guide pipe 11 is provided substantially perpendicular to a horizontal plane along a defined traveling path of the wire electrode WE. The guide pipe 11 is a device for guiding the wire electrode WE from the upper level of the automatic connection device 1 to the upper wire guide 4U so that the wire electrode WE does not deviate from the defined traveling path. The guide pipe 11 moves to and fro in a vertical direction by a lifting device. The guide pipe 11 moves to the upper limit position when annealing and cutting the wire electrode WE. The guide pipe 11 moves to the entrance of the upper wire guide 4U, which is the lower limit position, when the tip of the wire electrode WE is inserted into the pilot hole.

The wire vibration device 12 is provided immediately above the entrance of the guide pipe 11. The wire vibration device 12 is a device for giving a minute vertical vibration to the wire electrode WE. The wire vibration device 12 alternately inputs compressed air of a predetermined pressure sent from the compressed air supply device 6 from a pair of inlets 12A and 12B by switching an electromagnetic valve (not shown) and applies the pressure of the compressed air directly or indirectly to the wire electrode WE along the defined traveling path. As a result, the wire electrode WE slightly moves vertically, so that the wire electrode WE can be easily passed through the pilot hole.

An upper power supply electrode 13U and a lower power supply electrode 13L form a pair of annealing electrodes 13. One of the upper power supply electrode 13U and the lower power supply electrode 13L is connected to the positive electrode of a DC power supply of the current supply device 5, and the other is connected to the negative electrode. The intermediate power supply electrode 14 is connected to an electrode opposite to the electrode of the DC power supply to which the lower power supply electrode 13L is connected, supplies a fusing current to the wire electrode WE between the lower power supply electrode 13L, and intentionally cuts the electrode WE.

The electrode driving device 15 includes an upper electrode driving device 15U and a lower electrode driving device 15L. The upper electrode driving device 15U has an electromagnetic actuator that opens and closes the upper power supply electrode 13U formed by a pair of rotators. The electromagnetic actuator moves the upper power supply electrode 13U toward the wire electrode WE while electricity is being supplied. The lower electrode driving device 15L has an air cylinder or an electric cylinder. The air cylinder or the electric cylinder moves a slider in the horizontal direction, and moves the lower power supply electrode 13L and the intermediate power supply electrode 14 which are fixed to the slider toward the wire electrode WE.

The wire feeding mechanism 2 is a device for continuously feeding a new wire electrode WE that has not been fed for machining to the machining gap along the defined traveling path. The wire feeding mechanism 2 includes a tension device 10. The wire feeding mechanism 2 mainly includes a reel 21, a brake device 22, a servo pulley 23, and a delivery roller 10A that is rotated by a delivery motor 10B. Further, the wire feeding mechanism 2 is provided with a disconnection detector 24 such as a limit switch and a tension detector 10C such as a strain gauge.

Each rotator of the wire feeding mechanism 2, including the reel 21, the servo pulley 23 and the delivery roller 10A, is a guide for guiding the traveling wire electrode WE along the defined traveling path. In the following description, the direction in which each rotator rotates when sending out the wire electrode WE is referred to as a forward rotation direction, and the direction opposite to the forward rotation direction is referred to as a reverse rotation direction.

A wire bobbin 25 for storing the wire electrode WE is rotatably attached to the reel 21. Since the wire electrode WE is wound around the wire bobbin 25 and stored, the wire electrode WE is curly. The brake device 22 applies a required torque in the reverse rotation direction of the reel 21 to apply a back tension to the wire electrode WE. The brake device 22 prevents the wire bobbin 25 loaded on the reel 21 from idle running, and prevents the wire electrode WE in the wire feeding mechanism 2 from loosening.

Specifically, the brake device 22 is, for example, a brake motor such as a hysteresis motor or an electromagnetic brake such as an electromagnetic clutch. In the case where the brake device 22 is a brake motor, it can be operated in synchronization with the delivery motor 10B. In the case where the brake device 22 is an electromagnetic brake, it is controlled independently of the delivery motor 10B because the brake force is obtained by the frictional force of the electromagnetic clutch. However, since the timing at which the electromagnetic brake is activated and the brake force can be controlled by the control device 8, the electromagnetic brake can be operated in accordance with the operation timing of each device of the automatic connection device 1.

The servo pulley 23 is provided between the reel 21 and the delivery roller 10A. The servo pulley 23 applies a constant downward load to the wire electrode WE between the reel 21 and the delivery roller 10A by its own weight. The servo pulley 23 is provided so as to freely move vertically. Therefore, the servo pulley 23 moves vertically according to a minute change in tension. As a result, the servo pulley 23 stabilizes the tension by absorbing a minute vibration occurring in the wire electrode WE fed from the wire bobbin 25.

The tension device 10 is a device for applying a predetermined tension (tensile force) to the wire electrode WE, that is, a tensile force device. The tension device 10 is included in the wire feeding mechanism 2. The tension device 10 mainly includes the delivery roller 10A, the delivery motor 10B, the tension detector 10C, a pinch roller 10D, and a motor control device 10E.

The delivery roller 10A is rotated by the delivery motor 10B. The pinch roller 10D presses the wire electrode against the outer peripheral surface of the delivery roller 10A, whereby the delivery roller 10A obtains a driving force for moving the wire electrode WE. The delivery roller 10A keeps the wire electrode WE unloosened by a plurality of rollers including the pinch roller 10D, and allows the wire electrode WE to travel smoothly without being disconnected.

The delivery motor 10B is a servomotor. The delivery motor 10B is controlled through the motor control device 10E according to a command signal from the control device 8. The delivery motor 10B performs a servo operation by the motor control device 10E based on a detection signal of the tension detector 10C. Therefore, even when the set tension value is small, the tension of the wire electrode WE is stable, and the risk of the wire electrode WE becoming loosened or disconnected is further reduced. The control device 8 can control the delivery motor 10B according to the torque in a winding device 30 of the wire collecting mechanism 3.

When the wire electrode WE is stretched between the pair of wire guides 4U and 4L, the delivery roller 10A applies a predetermined tension to the wire electrode WE by a difference in rotation speed between the delivery roller 10A and a winding roller 30A of the winding device 30, in a state where the wire electrode WE is substantially stopped or while the wire electrode WE is being continuously fed to the machining gap at a predetermined traveling speed.

When connecting the wire electrode WE, the delivery roller 10A is rotated at a constant speed in the forward rotation direction by the delivery motor 10B, and the tip of the wire electrode WE is inserted into and passed therethrough the pilot hole and captured by the wire collecting mechanism 3. Further, when retrying automatic connection, the delivery roller 10A is rotated at a constant speed in the reverse rotation direction by the delivery motor 10B to wind up the wire electrode WE to a predetermined position.

The wire collecting mechanism 3 is a device for collecting the wire electrode WE consumed by being fed for machining from the machining gap along the defined traveling path. The wire collecting mechanism 3 includes the winding device 30, a rotator 31 for direction change, a transport pipe 32, an aspirator 33, a bucket 34, and a wire cutting machine 35. The winding device 30 mainly includes the winding roller 30A, a winding motor 30B, and a pinch roller 30C. The winding roller 30A configures a driving roller of the winding device 30, and the pinch roller 30C configures a driven roller of the winding device 30.

The advancing direction of the wire electrode WE that has passed through the pilot hole and through the lower wire guide 4L is changed by the rotator 31 into the horizontal direction, and the wire electrode WE is inserted into the transport pipe 32. The wire electrode WE in the transport pipe 32 is sucked by the aspirator 33 to obtain a propulsive force.

The wire electrode WE that has passed through and out of the transport pipe 32 is captured and clamped between the winding roller 30A and the pinch roller 30C of the winding device 30. The winding roller 30A is rotated at a predetermined rotation speed in the forward rotation direction by the winding motor 30B, which is a constant-speed rotation motor, and draws the wire electrode WE that has been used up to right above the bucket 34 while making it travel at a predetermined traveling speed. In the wire electric discharge machine 100 of the embodiment, the wire electrode WE drawn to above the bucket 34 is shredded by the wire cutting machine 35 and accommodated in the bucket 34.

The wire guide mechanism 4 includes a pair of upper and lower wire guides 4U and 4L provided to clamp the workpiece WP. The upper wire guide 4U and the lower wire guide 4L are incorporated in upper and lower guide assemblies 40A and 40B, respectively. The pair of wire guides 4U and 4L position the wire electrode WE on the defined traveling path and guide the traveling wire electrode WE. The pair of wire guides 4U and 4L are "ratchet guides" each having a ratchet shape. Since there is a clearance of several m between each wire guide 4U and 4L and the wire electrode WE, the tip of the wire electrode WE can be passed through the wire guides 4U and 4L at the time of automatic connection.

The upper and lower guide assemblies 40A and 40B respectively accommodate an upper conductor 5U and a lower conductor 5L for supplying a machining current from the current supply device 5 to the wire electrode WE. Further, the upper and lower guide assemblies 40A and 40B respectively incorporate upper and lower nozzles 8U and 8L for jetting and supplying to the machining gap a machining fluid jet having a predetermined pressure supplied from the machining fluid supply device 7.

The current supply device 5 includes at least a DC power supply, a switching circuit, and a relay switch. In the wire electric discharge machine 100 of the embodiment, the current supply device 5 includes a machining power supply circuit for supplying a machining current to the machining gap. Therefore, the current supply device 5 is a device for supplying a machining current by applying to the machining gap a voltage pulse necessary for electric discharge machining, and the current supply device 5 is also a device for supplying a predetermined annealing current and a predetermined fusing current to the wire electrode WE at the time of automatic connection.

The positive electrode of the DC power supply of the current supply device 5 is connected to the upper conductor 5U and the lower conductor 5L accommodated in the upper and lower guide assemblies 40A and 40B, respectively, and the negative electrode thereof is connected to the workpiece WP. During machining, the current supply device 5 repeatedly applies a voltage pulse to the machining gap through the upper and lower conductors 5U and 5L and the workpiece WP, and intermittently supplies a predetermined machining current to the machining gap.

In the current supply device 5 of the embodiment, the positive electrode of the DC power supply is connected respectively to the upper power supply electrode 13U and the intermediate power supply electrode 14 of the automatic connection device 1 via the relay switch (not shown), and the negative electrode thereof is connected to the lower power supply electrode 13L via the relay switch. The current supply device 5 supplies a predetermined annealing current to the wire electrode WE by conducting the pair of annealing electrodes 13 at the time of automatic connection. Further, when the wire electrode WE is to be cut intentionally, the current supply device 5 conducts the lower power supply electrode 13L and the intermediate power supply electrode 14 to supply a predetermined fusing current to the wire electrode WE.

The compressed air supply device 6 is a device for supplying compressed air for operation to the wire vibration device 12 of the automatic connection device 1. The compressed air supply device 6 includes a compressed air supply source such as an air compressor, a plurality of solenoid valves, and a regulator (not shown). The compressed air supply device 6 adjusts the high-pressure compressed air of the compressed air supply source to a predetermined pressure by the regulator, and periodically switches the solenoid valves to alternately supply the compressed air having a predetermined pressure to the pair of inlets 12A and 12B of the wire vibration device 12.

The machining fluid supply device 7 is a device for supplying a machining fluid jet having a predetermined pressure to the machining gap. The machining fluid supply device 7 supplies a clean machining fluid stored in a service tank to upper and lower machining fluid jet nozzles 7U and 7L respectively provided in the upper and lower guide assemblies 40A and 40B by a jet pump (not shown). As a result, a machining fluid jet having a predetermined pressure is ejected from each of the machining fluid jet nozzles 7U and 7L toward the machining gap coaxially with respect to the axial direction of the defined traveling path of the wire electrode WE. In addition, in FIG. 1, the path of the machining fluid in the middle from the machining fluid supply device 7 to the wire guide mechanism 4 is not shown, but the part of the path marked by (A) that has exited from the machining fluid supply device 7 is connected to the part of the path marked by (A) leading to the wire guide mechanism 4.

The control device 8 is a device for controlling the operation of the wire electric discharge machine 100. Hereinafter, main control among the control operations of the control device 8 will be described. In the wire electric discharge machine 100 of the embodiment, the control device 8 controls the operation of the automatic connection device 1. The control device 8 controls, in particular, the current supply device 5 and the tension device 10.

The control device 8 controls the tension device 10 so that the tension is applied to the wire electrode WE with the set tension value decreased to 80 g or less as small as possible during a predetermined period during which a predetermined annealing current is being supplied from the current supply device 5. In particular, the control device 8 controls the automatic connection device 1 so that at the same time as the supply of the predetermined annealing current is stopped, the wire electrode WE is exposed to the air to cool gradually while not being heated for a predetermined period of time.

The control device 8 controls the current supply device 5 to supply a predetermined annealing current after the predetermined period elapses after the tension of the set tension value small enough as described above is applied to the wire electrode WE. Further, the control device 8 controls the tension device 10 to apply the tension to the wire electrode WE by decreasing the set tension value by 10 g or more within a range where the set tension value does not become 0 g at the same time as the predetermined annealing current is stopped, and then restoring the set tension value to the original set tension value after the predetermined period has elapsed.

Next, a configuration for always machining the workpiece WP at a non-consumable part of the wire electrode WE will be described. In the embodiment, in order to enable such machining, the wire electrode WE fed to the machining position is rotated around an axis. That is, in the configuration shown in FIG. 1, the wire electrode WE that has passed through the lower guide assembly 40B disposed below the workpiece WP is wound around the outer peripheral surface of the rotator 31 for direction change. The rotator 31 has a winding part 31a, around which the wire electrode WE is wound on the outer peripheral surface, and large diameter parts 31b arranged on both left and right ends thereof, and the rotator 31 rotates around a rotation shaft 31c.

Figure 4:
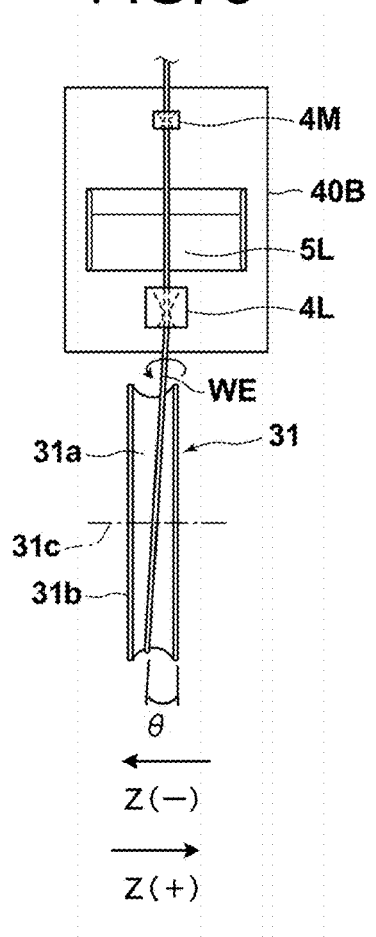
FIG. 4 is a front view of the part shown in FIG. 3.

As shown in FIG. 4, the rotator 31 is disposed at a position where its axial-direction center position is deviated in the rotation axis direction Z with respect to a straight line connecting the upper wire guide 4U and the lower wire guide 4L. The wire electrode WE is wound around the axial-direction center part, which has the smallest diameter, of the winding part 31a provided on the outer peripheral surface of the rotator 31, and the positional relationship between the lower wire guide 4L and the rotator 31 is as described above. Therefore, the wire electrode WE bends and advances when it passes through and out of the lower wire guide 4L downward. Thus, the wire electrode WE is disposed inclined with respect to the direction orthogonal to the rotation axis direction Z (the direction in which the rotation shaft 31c extends) as viewed from the horizontal direction. In addition, the inclination angle θ is set so that the wire electrode WE rotates ¼ to 1 turn from the front surface of the workpiece WP, which is the machining start position at a certain point of the wire electrode WE, to the back surface of the workpiece WP, which is the machining end position, and the inclination angle θ is preferably in the range of 0.1 to 1.0° (degrees).

Figure 3:
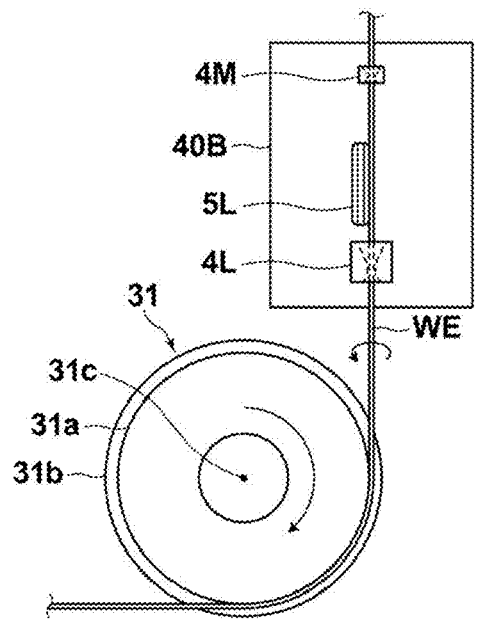
FIG. 3 is a side view showing a main part of the wire electric discharge machine 100 of the embodiment.
Figure 5:
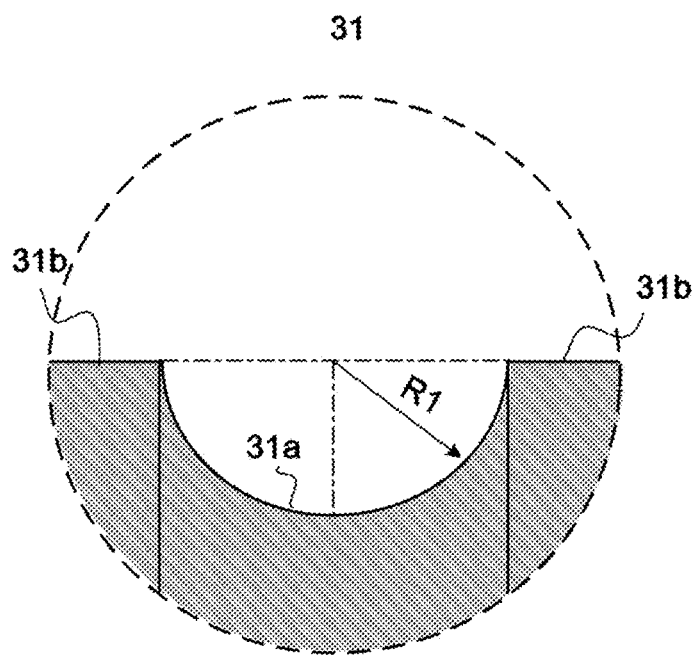
FIG. 5 is an enlarged view showing a winding part 31a of a rotator 31 of the embodiment.

The winding part 31a has the smallest diameter at the axial-direction center part, and its diameter gradually increases toward the left and right ends, and it is formed in a drum shape as a whole (FIG. 3, FIG. 4, and FIG. 5). As shown in FIG. 5, the cross section of the outer circumference of the winding part 31a has an arc shape, and the curvature radius R1 of the cross section of the winding part 31a is formed to be larger than that of the wire electrode WE. The cross section is taken so as to lie in the same plane as the rotation axis of the rotator 31.

In order for the wire electrode WE to rotate ¼ to 1 turn within the thickness of the workpiece WP, the rotation speed of the wire electrode WE is important. The rotation speed is determined by the diameter of the wire electrode WE, the curvature radius R1 of the cross section of the outer circumference of the winding part 31a, the deviation amount of the rotator 31 in the rotation axis direction Z (the inclination angle θ), and the like. Since the diameter of the wire electrode WE used in an electric discharge machine is mainly about 0.1 to 0.3 mm, the curvature radius R1 is preferably about 0.3 mm.

In addition, the winding part 31a of the embodiment may adopt any shape in addition to the cross-sectional shape shown in FIG. 5, as long as the shape has the smallest diameter at the axial-direction center part and the diameter gradually increases toward the left and right end sides.

The wire electrode WE wound around the rotator 31 in such a state receives a force in a direction for rotating itself around the axis when advancing along the rotator 31.

The principle of rotation of the wire electrode WE in the wire electric discharge machine 100 according to the disclosure will be specifically described with reference to FIG. 6 and FIG. 7. Here, FIG. 6 and FIG. 7 schematically show a state viewed from above in FIG. 1, that is, a state viewed from the upstream side in the feed direction of the wire electrode WE.

Figure 6:
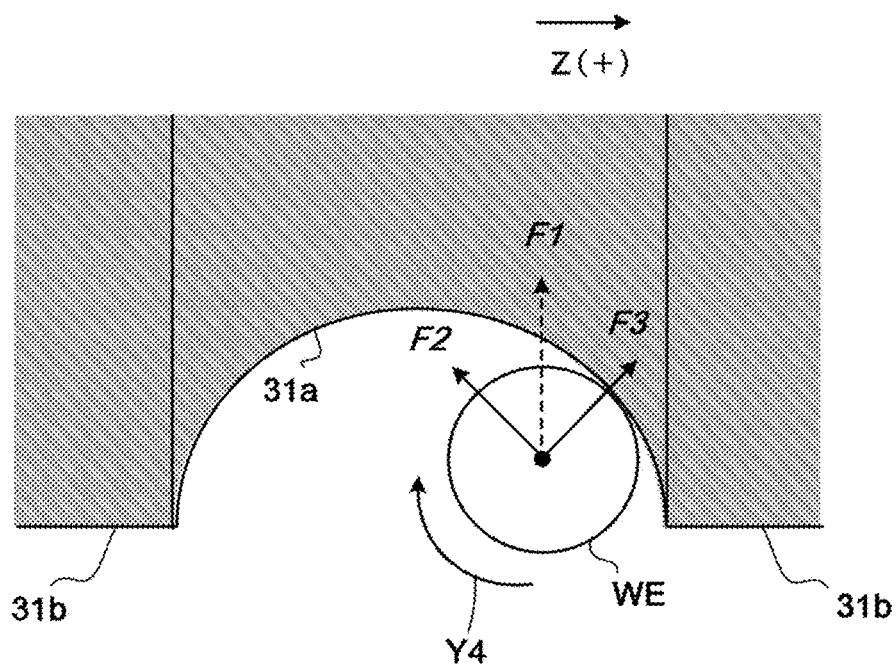
FIG. 6 is a schematic view showing a rotation principle (counterclockwise) of the wire electrode WE in the wire electric discharge machine of the disclosure.

As shown in FIG. 4, in the case where the axial-direction center position of the rotator 31 is disposed at a position deviated to the left side, which is the rotation axis negative direction Z (−), with respect to the straight line connecting the upper wire guide 4U and the lower wire guide 4L, the wire electrode WE contacts, in the upper part of the rotator 31, a position deviated to the right side in the positive direction Z (+) with respect to the axial-direction center position of the rotator 31 (FIG. 6). Since a tension is applied to the wire electrode WE by the tension device 10, a force F1 for pressing the wire electrode WE against the rotator 31 is generated by the tension. The force F1 for pressing the wire electrode WE against the rotator 31 includes a component force F3 acting on a contact surface between the wire electrode WE and the rotator 31 and a component force F2 for rotating the wire electrode WE toward the axial-direction center position of the rotator 31, and the wire electrode WE is rotated clockwise by the component force F2 as viewed from the upstream side in the feed direction.

Figure 7:
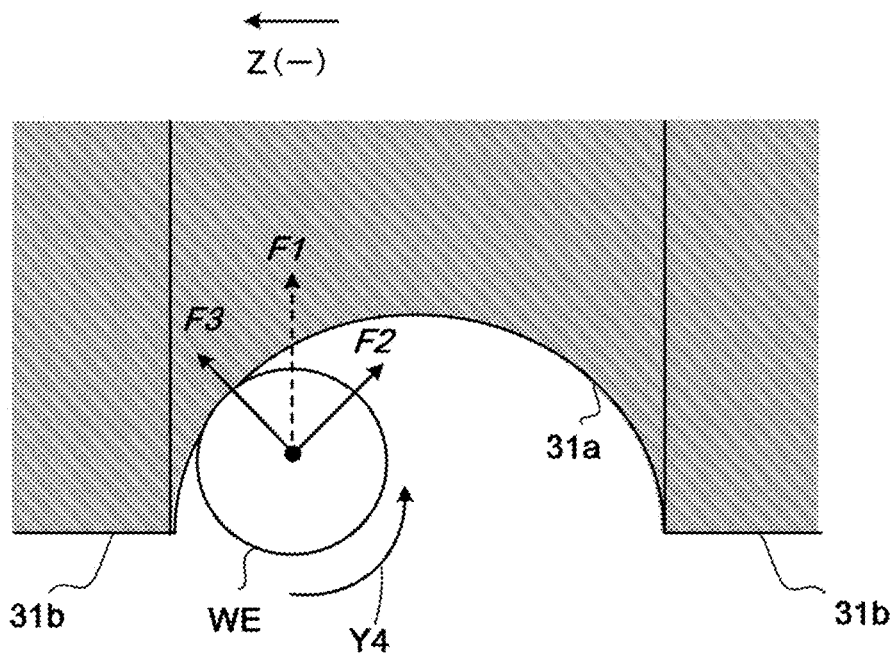
FIG. 7 is a schematic view showing a rotation principle (clockwise) of the wire electrode WE in the wire electric discharge machine of the disclosure.

On the other hand, in the case where the axial-direction center position of the rotator 31 is disposed at a position deviated to the right side, which is the rotation axis positive direction Z (+), with respect to the straight line connecting the upper wire guide 4U and the lower wire guide 4L, the wire electrode WE contacts, in the upper part of the rotator 31, a position deviated to the left side in the negative direction Z (−) with respect to the axial-direction center position of the rotator 31 (FIG. 7). As in the case of FIG. 6, the force F1 for pressing the wire electrode WE against the rotator 31 includes the component force F3 acting on the contact surface between the wire electrode WE and the rotator 31 and the component force F2 for rotating the wire electrode WE toward the axial-direction center position of the rotator 31, and the wire electrode WE is rotated counterclockwise by the component force F2 as viewed from the upstream side in the feed direction.

This rotation of the wire electrode WE is also transmitted to the part of the wire electrode WE, which faces the workpiece WP with the machining gap therebetween, further to the upstream side of the wire electrode feed direction than the rotator 31.

The "wire electrode feed direction" indicates the direction in which the wire electrode WE is fed from the wire bobbin 25 to the wire collecting mechanism 3 shown in FIG. 1 (the direction changes for each feed position). In this way, if the wire electrode WE facing the workpiece WP is rotated around the axis, wire electric discharge machining can be performed by a part of the wire electrode WE that has not been consumed. Further, in this case, the rotation of the wire electrode WE with respect to the length of the workpiece WP is desirably one turn or less, and it is also possible to effectively prevent the deterioration of the machining surface quality and the deterioration of the machining dimensional accuracy by appropriately setting the rotation direction with respect to the machining advancing direction. The appropriate setting of the rotation direction of the wire electrode WE will be described later in detail.

(Embodiment of Wire Electric Discharge Machining Method)

Figure 8:
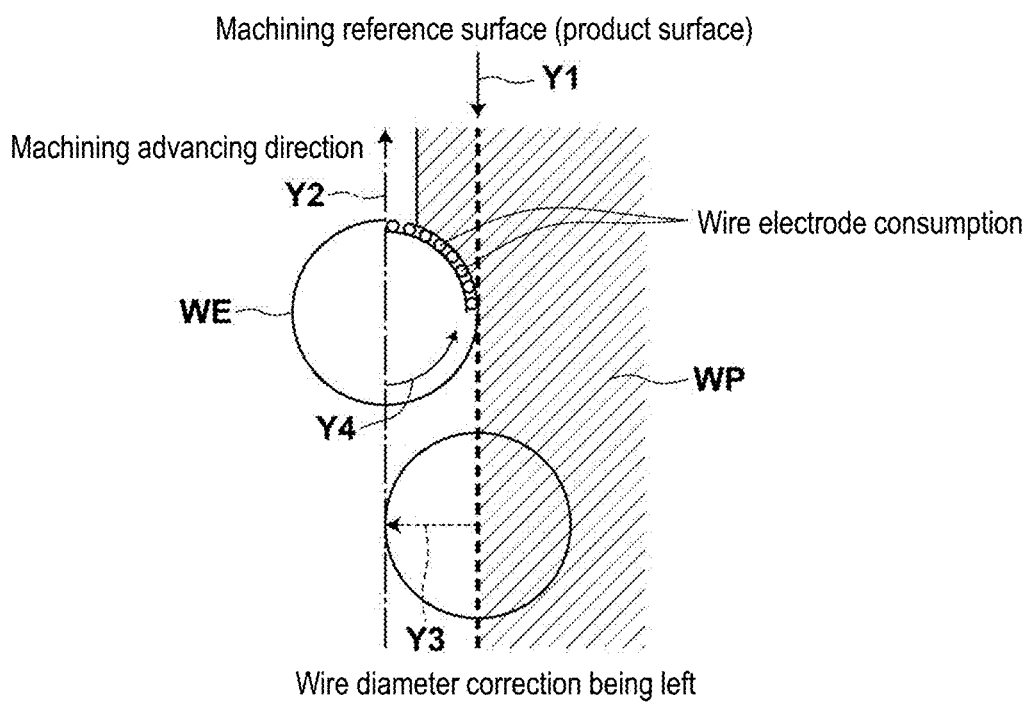
FIG. 8 is a schematic view 1 illustrating a wire electric discharge machining method of the disclosure.
Figure 9:
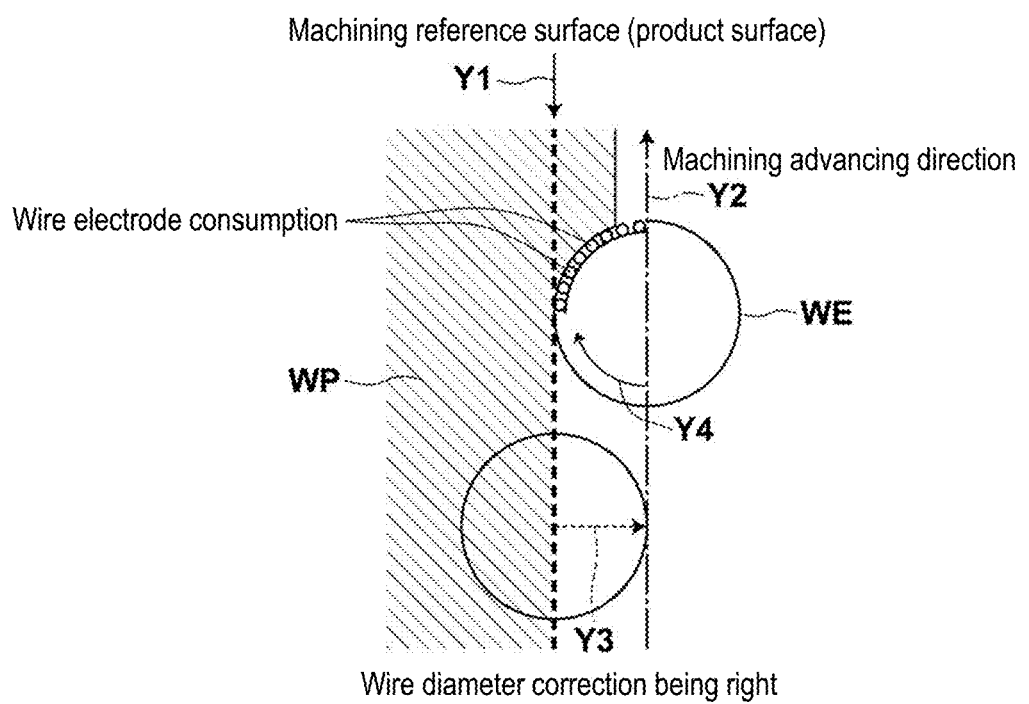
FIG. 9 is a schematic view 2 illustrating a wire electric discharge machining method of the disclosure.

Next, an embodiment of the wire electric discharge machining method of the disclosure will be described with reference to FIG. 8 and FIG. 9. In the following description, the method will be described as being performed in the wire electric discharge machine according to the first embodiment shown in FIG. 1 to FIG. 4. FIG. 8 and FIG. 9 schematically show a state in which the workpiece WP (hatched part) shown in FIG. 1 is machined by the wire electrode WE, as viewed from above in FIG. 1, that is, viewed from the upstream side of the feed direction of the wire electrode WE. In these figures, a broken line part indicated by the arrow Y1 indicates a surface where it is desired to remove the workpiece WP by wire electric discharge machining to obtain a new product surface, that is, a machining reference surface.

In order to form this machining reference surface, the wire electrode WE is fed to the workpiece WP in a machining advancing direction indicated by the arrow Y2. FIG. 8 shows a case where the machining reference surface (machining surface) is on the right side in the machining advancing direction, while FIG. 9 shows a case where the machining reference surface is on the left side in the machining advancing direction. When the wire electrode WE disposed at this correction position is fed in the machining advancing direction as described above, at the same time, the wire electrode WE is continuously fed from top to bottom in FIG. 1 (from the near side to the back side in FIG. 8 and FIG. 9).

As the wire electrode WE is fed in the machining advancing direction, a discharge generated between the wire electrode WE and the workpiece WP forms the machining reference surface along the machining advancing direction. Here, in the method, in the case where the machining reference surface is on the right side in the machining advancing direction as shown in FIG. 8, the rotation direction of the wire electrode WE around the axis (the direction indicated by the arrow Y4) is set to be counterclockwise. In addition, in the case where the machining reference surface is on the left side in the machining advancing direction as shown in FIG. 9, the rotation direction of the wire electrode WE around the axis is set to be clockwise.

Here, as shown in FIG. 8, when the machining reference surface of the workpiece WP is on the right side in the machining advancing direction of the wire electrode WE, if the rotation direction of the wire electrode WE is set clockwise as viewed from the traveling direction of the wire electrode WE, for example, then the machining of the machining reference surface is performed by the part that has been consumed by machining the left side surface and the front. Therefore, the machining accuracy of the machining reference surface decreases. Conversely, if the rotation direction of the wire electrode WE is set counterclockwise as viewed from the traveling direction of the wire electrode WE, the machining reference surface of the workpiece WP can be machined by the unconsumed wire electrode WE, and then the front can be machined by the consumed part.

Further, as shown in FIG. 9, when the machining surface of the workpiece WP is on the left side in the machining advancing direction of the wire electrode WE, if the rotation direction of the wire electrode WE is set counterclockwise as viewed from the traveling direction of the wire electrode WE, for example, then the machining of the machining reference surface is performed by the part that has been consumed by machining the right side surface and the front. Therefore, the machining accuracy of the machining reference surface decreases. Conversely, if the rotation direction of the wire electrode WE is set clockwise as viewed from the traveling direction of the wire electrode WE, the machining reference surface of the workpiece WP can be machined by the unconsumed wire electrode WE, and then the front can be machined by the consumed part.

Second Embodiment of the Disclosure

Figure 10:
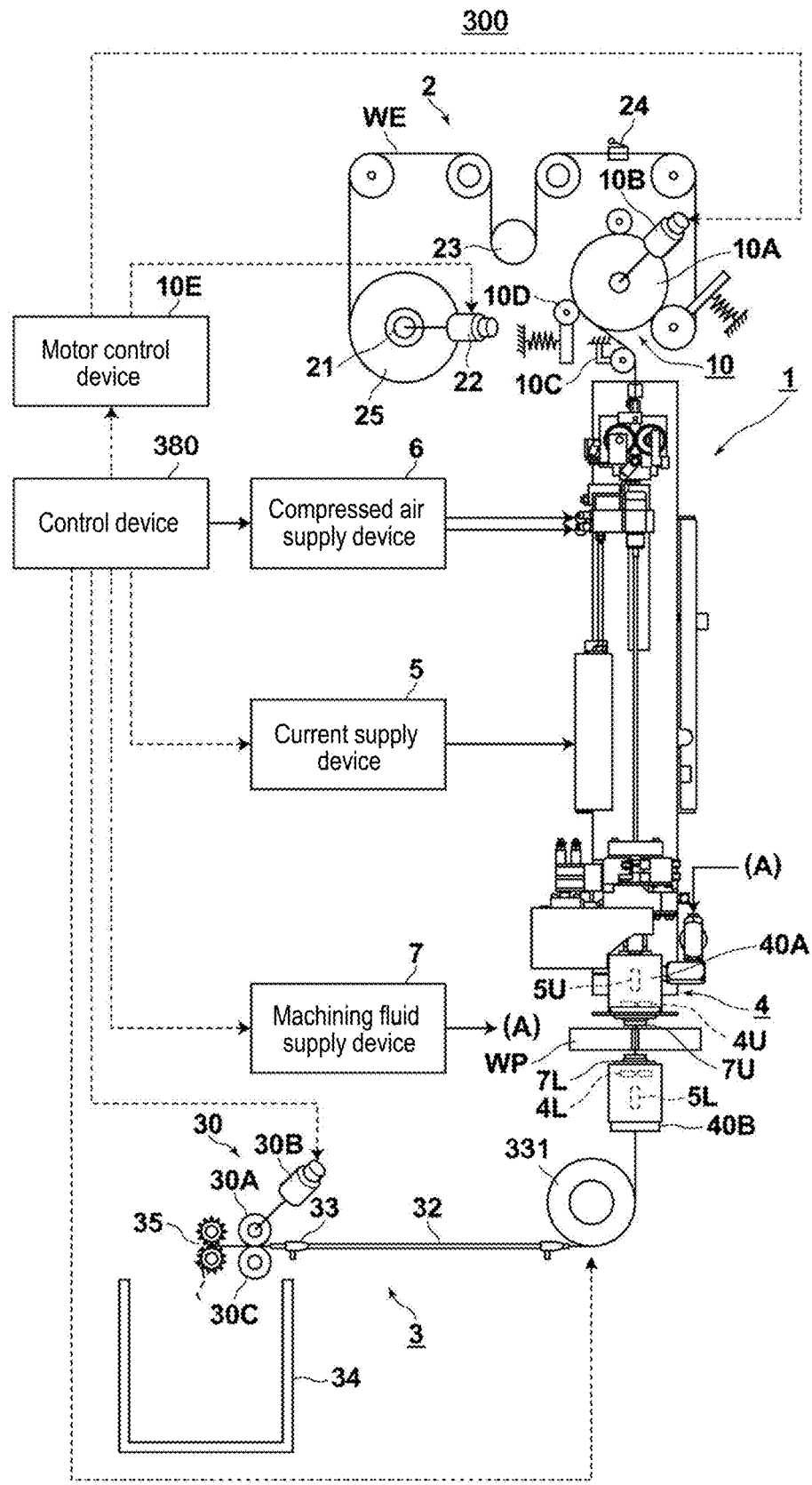
FIG. 10 is a schematic side view showing a wire electric discharge machine 300 according to a second embodiment of the disclosure.

FIG. 10 is a schematic side view showing a wire electric discharge machine 300 according to a second embodiment of the disclosure. The wire electric discharge machine 300 according to the second embodiment is provided with a rotator unit 301 that can automatically change the position of a rotator 331 in the rotation axis direction Z, and other configurations are the same as the wire electric discharge machine 100 according to the first embodiment. Therefore, the same reference numerals are used, and the detailed description is omitted.

The wire electric discharge machine 300 of the disclosure includes the automatic connection device 1, the wire feeding mechanism 2, the wire collecting mechanism 3, the wire guide mechanism 4, the current supply device 5, the compressed air supply device 6, the machining fluid supply device 7, and a control device 380.

The wire collecting mechanism 3 includes the winding device 30, the transport pipe 32, the aspirator 33, the bucket 34, the wire cutting machine 35, and the rotator unit 301 having a rotator 331 for direction change therein. The rotator 331 moves to three positions according to a command from the control device 380.

Figure 11:
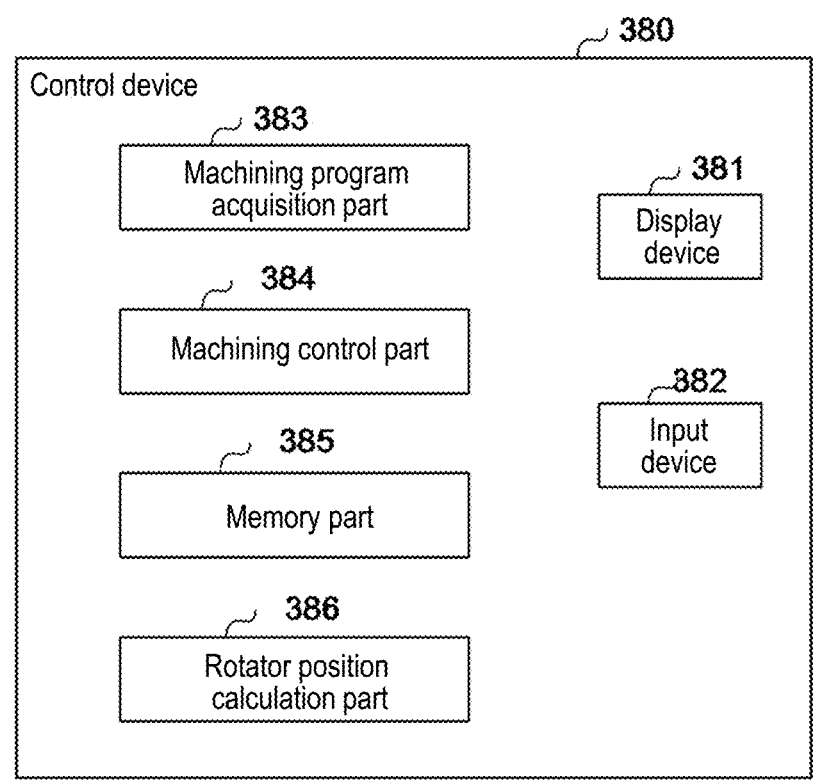
FIG. 11 is a block diagram showing the control device 380 of the embodiment.
Figure 14:
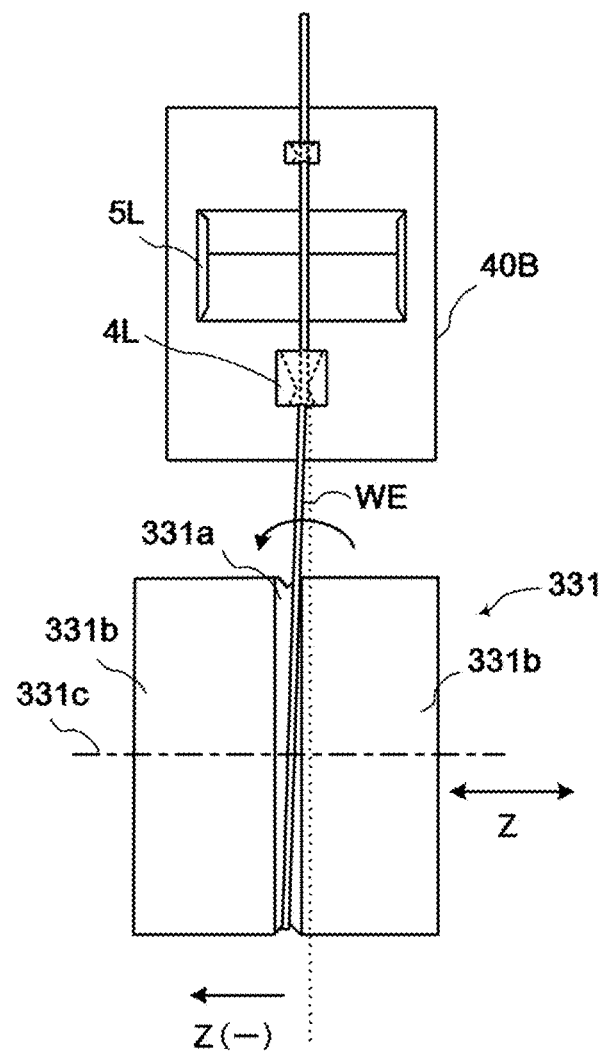
FIG. 14 is a schematic view showing a positional relationship among the lower wire guide 4L, the wire electrode WE, and the rotator in a case where the rotator 331 is located on the left side in the embodiment.
Figure 16:
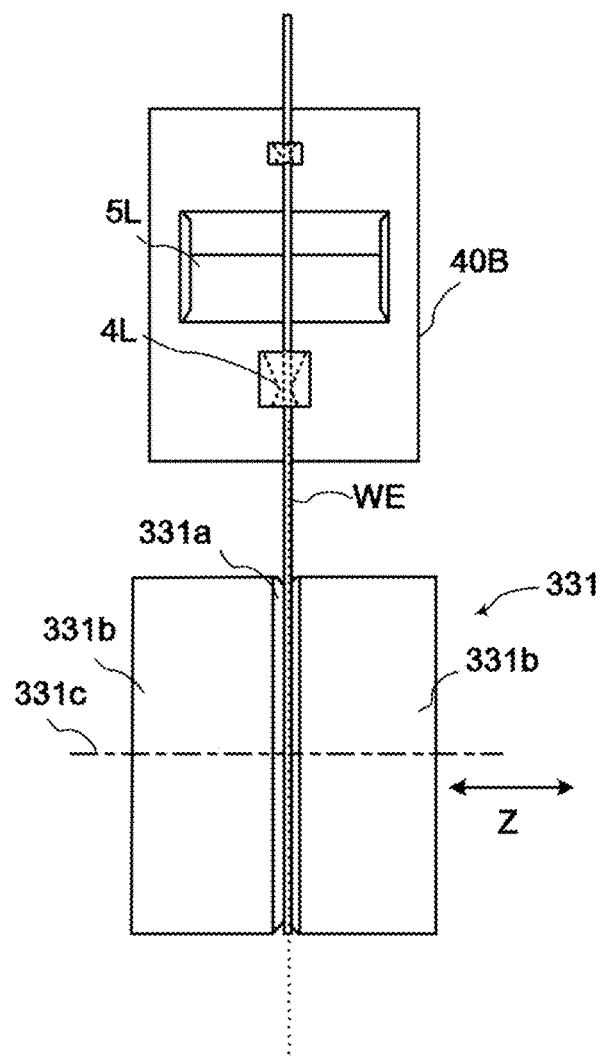
FIG. 16 is a schematic view showing a positional relationship among the lower wire guide 4L, the wire electrode WE, and the rotator in a case where the rotator 331 is located at the axial-direction center position in the embodiment.
Figure 18:
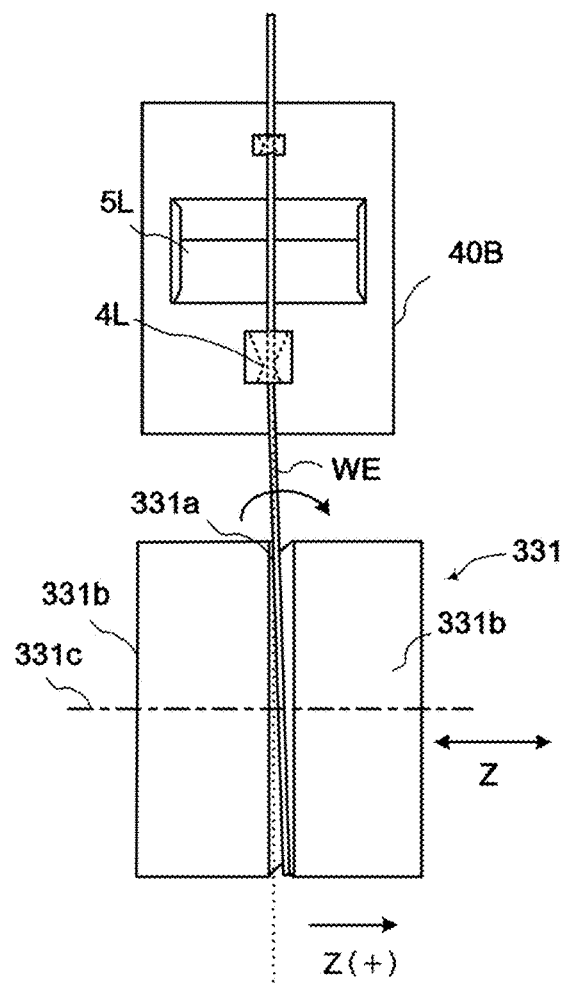
FIG. 18 is a schematic view showing a positional relationship among the lower wire guide 4L, the wire electrode WE, and the rotator in a case where the rotator 331 is located on the right side in the embodiment.

FIG. 11 is a block diagram showing the control device 380 of the embodiment. FIG. 14 is a schematic view showing a positional relationship among the lower wire guide 4L, the wire electrode WE, and the rotator in a case where the rotator 331 is located on the left side in the embodiment. FIG. 16 is a schematic view showing a positional relationship among the lower wire guide 4L, the wire electrode WE, and the rotator in a case where the rotator 331 is located at the axial-direction center position in the embodiment. FIG. 18 is a schematic view showing a positional relationship among the lower wire guide 4L, the wire electrode WE, and the rotator in a case where the rotator 331 is located on the right side in the embodiment.

The control device 380 includes an operation panel including a display device 381 and an input device 382, and includes a machining program acquisition part 383, a machining control part 384, a memory part 385, and a rotator position calculation part 386.

The machining program acquisition part 383 has a function of acquiring a machining program including machining shape trajectory data and machining condition data. Here, the machining shape trajectory data is data that defines the operation trajectory of the machine according to the machining shape, and the machining condition data is data configured by machining conditions of the machine, such as a peak current value, an average machining voltage, a machining feed speed, and a position of the rotator 331.

The machining program acquisition part 383 decodes an NC program input by an operator to acquire the machining program. When the operator inputs information such as the machining surface roughness and the machining shape accuracy from the input device 382, it is also possible to search and acquire the machining conditions from a database stored in the memory part 385 in advance.

The rotator position calculation part 386 determines at which position—among a position on the left side that is the rotation axis negative direction Z (−) with respect to the straight line connecting the upper wire guide 4U and the lower wire guide 4L (FIG. 14), a center position on the straight line connecting the upper wire guide 4U and the lower wire guide 4L (FIG. 16), and a position on the right side that is the rotation axis positive direction Z (+) with respect to the straight line connecting the upper wire guide 4U and the lower wire guide 4L (FIG. 18)—the rotator 331 is to be disposed based on information of the machining program, and sets it in the machining program as machining condition data.

When the machining reference surface Y1 of the workpiece WP is on the right side in the machining advancing direction of the wire electrode WE, if the rotation direction of the wire electrode WE is set counterclockwise as viewed from the traveling direction of the wire electrode WE, the machining reference surface Y1 of the workpiece WP can always be machined by the unconsumed wire electrode WE (FIG. 8). On the other hand, when the machining reference surface Y1 of the workpiece WP is on the left side in the machining advancing direction of the wire electrode WE, if the rotation direction of the wire electrode WE is set clockwise as viewed from the traveling direction of the wire electrode WE, the machining reference surface Y1 of the workpiece WP can always be machined by the unconsumed wire electrode WE (FIG. 9).

Therefore, the rotator position calculation part 386 calculates the positional relationship between the machining advancing direction Y2 of the wire electrode WE and the machining reference surface Y1 from the machining program; selects the position of the rotator 331 from the left position, the center position, and the right position; and sets it as the machining condition data.

Here, as shown in FIG. 14, in the case where the rotator 331 is disposed at a position (left position) deviated in the rotation axis negative direction Z (−) with respect to the straight line connecting the upper wire guide 4U and the lower wire guide 4L, the wire electrode WE rotates clockwise as viewed from the traveling direction. Further, as shown in FIG. 18, in the case where the rotator 331 is disposed at a position (right position) deviated in the rotation axis positive direction Z (+) with respect to the straight line connecting the upper wire guide 4U and the lower wire guide 4L, the wire electrode WE rotates counterclockwise as viewed from the traveling direction. In addition, as shown in FIG. 16, in the case where the rotator 331 is disposed at a position (center position) on the straight line connecting the upper wire guide 4U and the lower wire guide 4L, the wire electrode WE does not rotate.

The positional relationship between the machining advancing direction Y2 of the wire electrode WE and the machining reference surface Y1 can also be derived from an offset direction which is machining condition data. Specifically, in a case where the offset direction Y3 is the left direction on the paper (FIG. 8), the rotator 331 is set to the right position. In a case where the offset direction Y3 is the right direction on the paper (FIG. 9), the rotator 331 is set to the left position.

In addition, in the machining process of the wire electric discharge machine, the same machining program is performed for a plurality of times so that rough machining is performed first with emphasis on machining speed, leaving a margin for finishing machining, and then finishing machining is repeated while reducing machining energy to adjust the shape accuracy. The finishing machining may be performed in the same direction as the rough machining path, or may be performed alternately in the opposite direction and in the same direction. In the case where the machining advancing direction Y2 of the wire electrode WE is in opposite directions for the rough machining and the finishing machining, setting is performed so that the position of the rotator 331 is changed accordingly.

In the case where the position of the rotator 331 is set in the machining condition data in advance, the rotator position calculation part 386 may not calculate the position of the rotator 331. For example, in the case where a rotation stop is set in the machining condition data in advance, it is possible not to rotate the wire electrode by setting the position of the rotator 331 to the center position (FIG. 18) in the rotator position calculation part 386.

The machining control part 384 is a function of controlling the operation of the wire electric discharge machine 300. The machining control part 384 drives each device of the wire electric discharge machine 300 based on the machining condition data and the machining shape trajectory data of the machining program to machine the workpiece WP. At the time of electric discharge machining, the machining control part 384 moves the rotator 331 according to the position of the rotator 331 set in the machining program, and makes the wire electrode WE rotate clockwise or counterclockwise.

Figure 12:
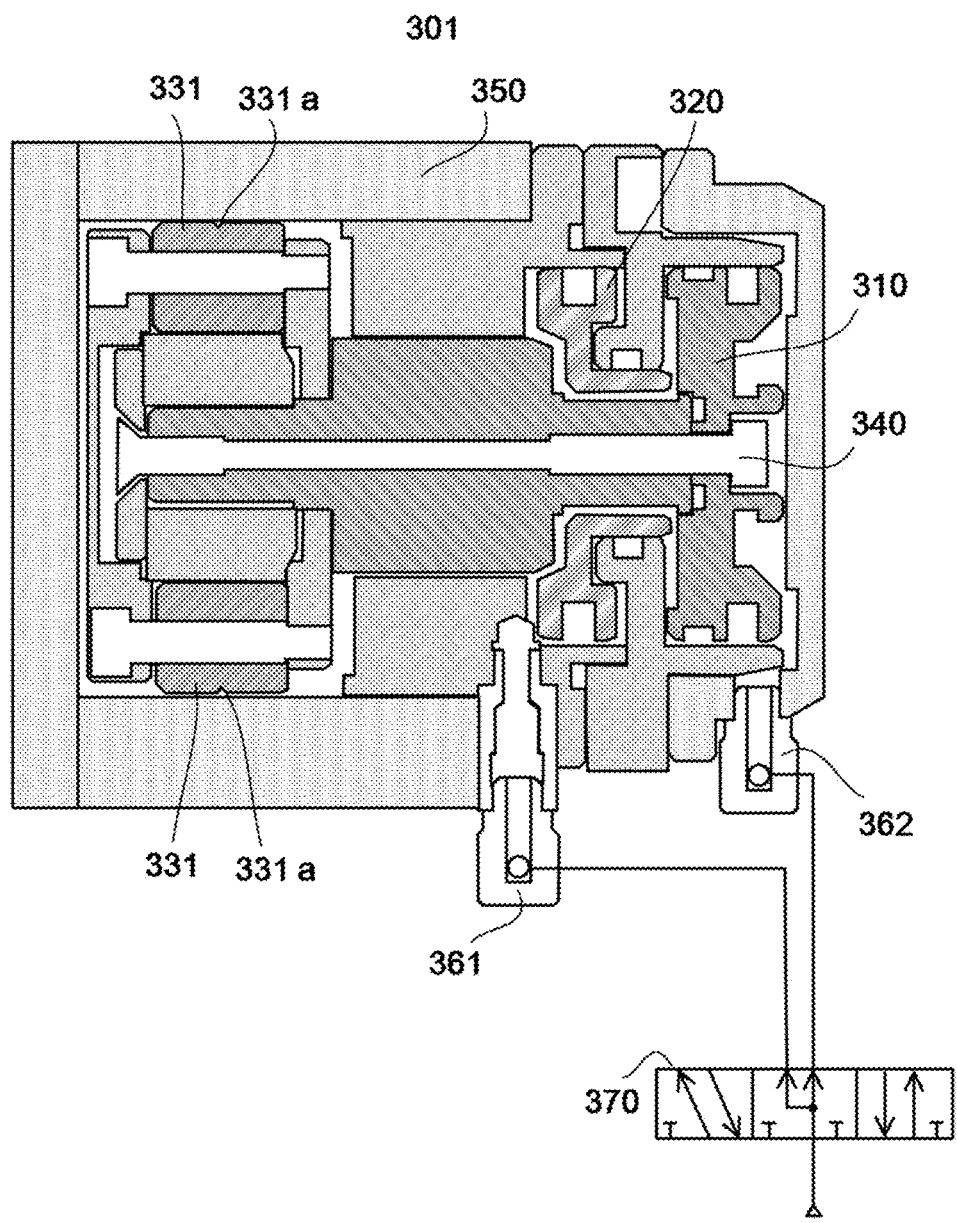
FIG. 12 is a schematic cross-sectional view showing the rotator unit 301 of the embodiment.

FIG. 12 is a schematic cross-sectional view showing the rotator unit 301 of the embodiment.

The rotator unit 301 is a device that can move the rotator 331 to the three positions including the left position, the center position, and the right position. For example, a three-position cylinder is used as the rotator unit 301.

The rotator unit 301 includes, in a cylinder body 350, a main piston 310, an intermediate piston 320, the rotator 331, a rod 340, a first port 361, a second port 362, and a solenoid valve 370. Here, a breathing port serving as an atmosphere opening port is not shown.

The rotator unit 301 is disposed so that the rotator 331 at the center position is located on the straight line connecting the upper wire guide 4U and the lower wire guide 4L.

The main piston 310 is a piston that moves to the three positions including the left position, the center position, and the right position by supplying air to and discharging air from the cylinder body 350 through the first port 361 and the second port 362.

The intermediate piston 320 is provided between the main piston 310 and the rotator 331 and is a piston for positioning the center position.

The rotator 331 is a member such as a roller or a pulley for changing the direction of the wire electrode WE, and includes a winding part 331a, around which the wire electrode WE is wound, and large diameter parts 331b disposed on both left and right sides thereof, and the rotator 331 rotates around a rotation shaft 331c. Since the shape of the winding part 331a is the same as the shape of the winding part 31a of the rotator 31 of the first embodiment, a detailed description is omitted.

The rod 340 is a member for connecting the main piston 310 and the rotator 331. One end of the rod 340 is attached to the center part of the main piston 310, and the other end is attached to the center position of the rotating shaft of the rotator 331.

The first port 361 and the second port 362 are piping connection ports for supplying compressed air into the cylinder body 350 and discharging the compressed air to the atmosphere. The main piston 310 can be switched to the three positions by adjusting the air pressure supplied from the first port 361 and the second port 362.

The solenoid valve 370 is a valve for controlling the flow direction of air pressure supplied to or discharged from the cylinder body 350. In the embodiment, a 5-port solenoid valve is used. The solenoid valve 370 is connected to the first port 361 and the second port 362.

Figure 13:
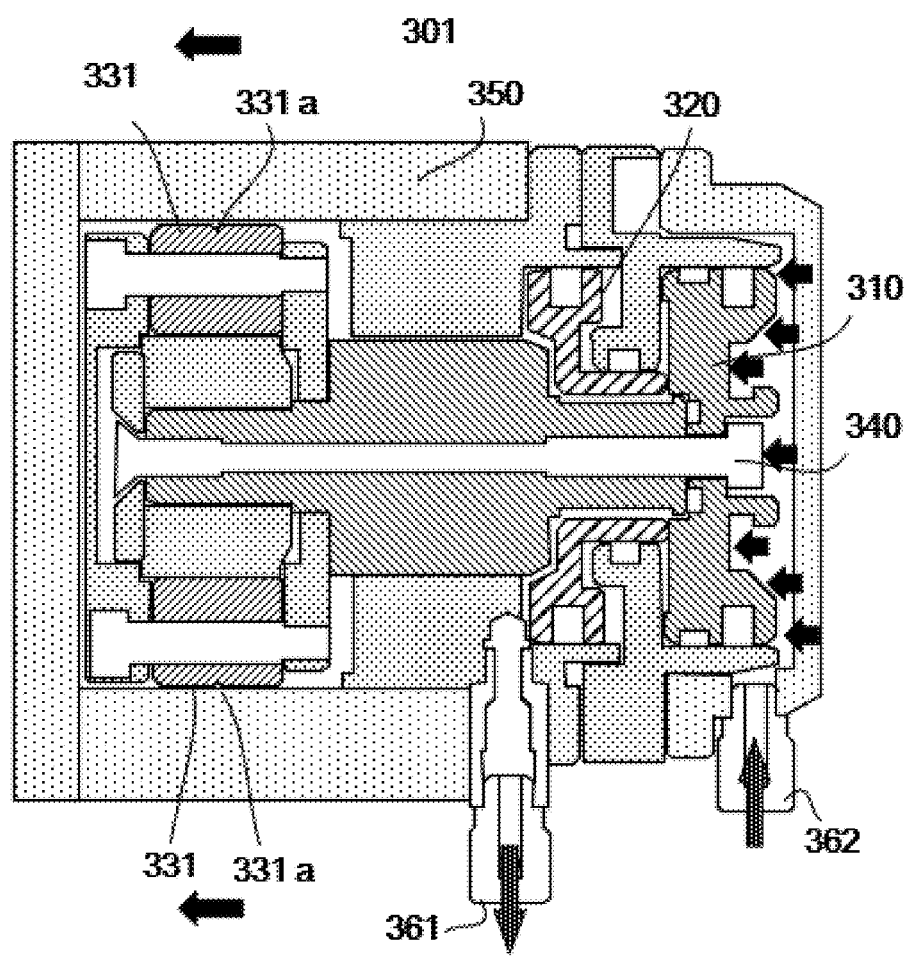
FIG. 13 is a schematic cross-sectional view showing the rotator unit 301 in a case where the rotator 331 is located on the left side in the embodiment.
Figure 15:
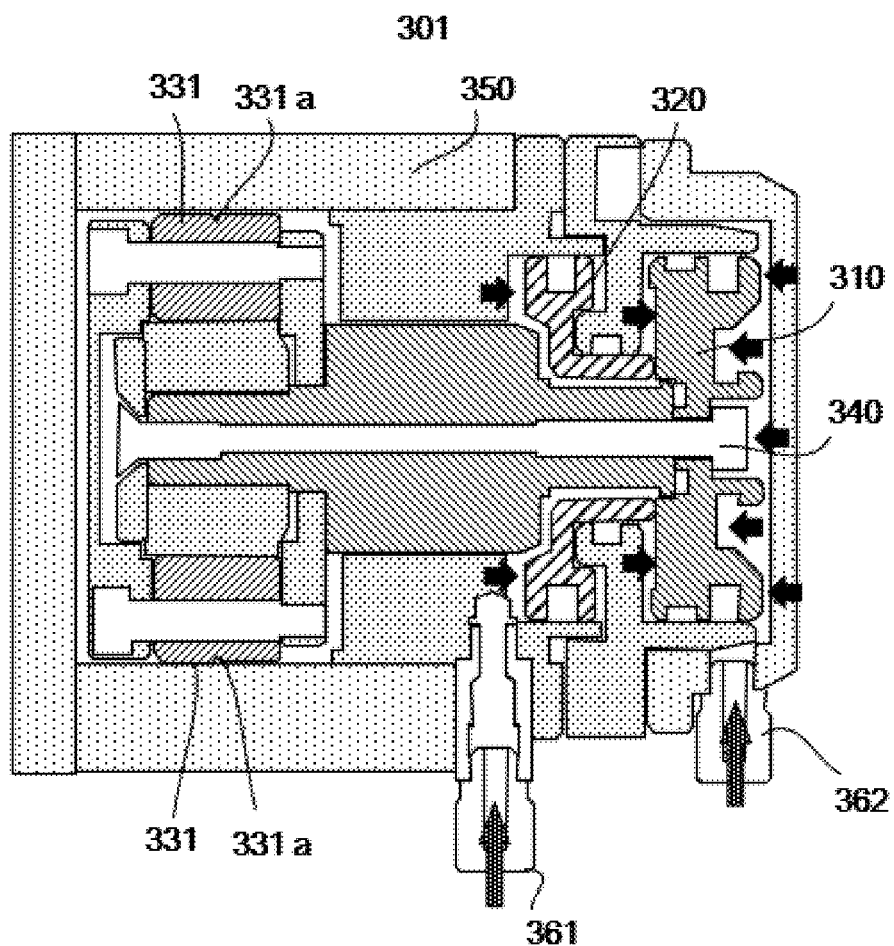
FIG. 15 is a schematic cross-sectional view showing the rotator unit 301 in a case where the rotator 331 is located at the axial-direction center position in the embodiment.
Figure 17:
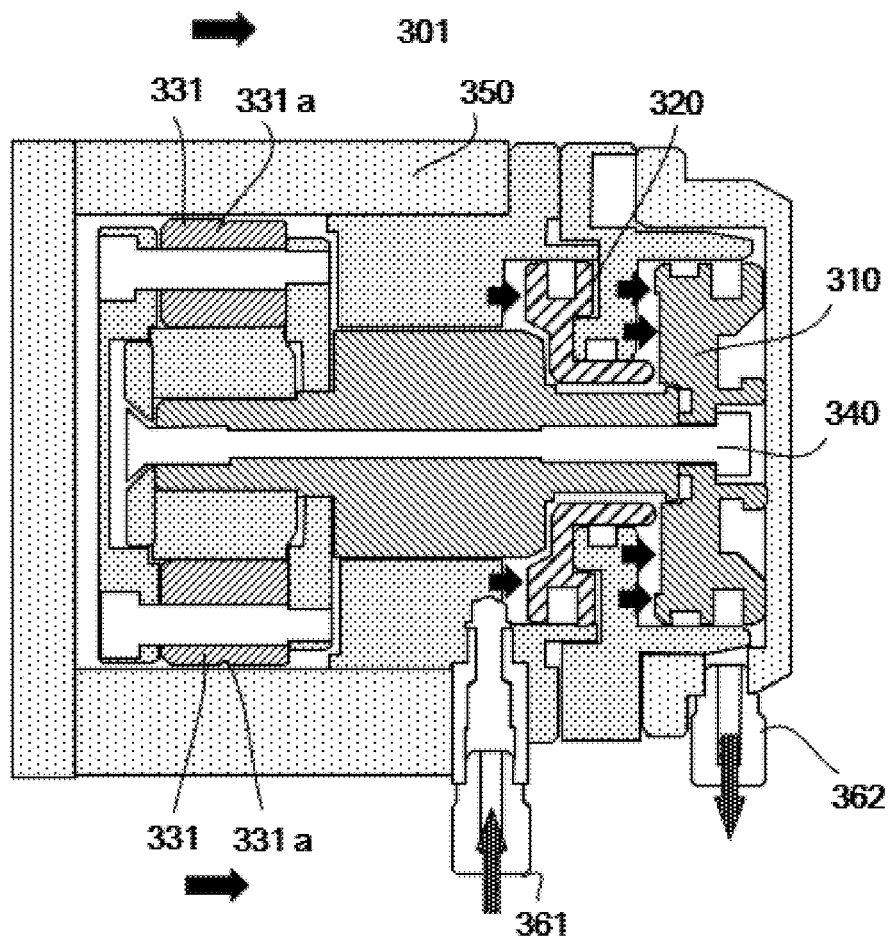
FIG. 17 is a schematic cross-sectional view showing the rotator unit 301 in a case where the rotator 331 is located on the right side in the embodiment.

FIG. 13 is a schematic cross-sectional view showing the rotator unit 301 in a case where the rotator 331 is located on the left side in the embodiment. FIG. 15 is a schematic cross-sectional view showing the rotator unit 301 in a case where the rotator 331 is located at the axial-direction center position in the embodiment. FIG. 17 is a schematic cross-sectional view showing the rotator unit 301 in a case where the rotator 331 is located on the right side in the embodiment.

In the rotator unit 301, as shown in FIG. 13, only the second port 362 is pressurized, and the compressed air is discharged from the first port 361, whereby the main piston 310 is pushed by the compressed air in the rotation axis negative direction Z (−) of the rotator 331, and the rod 340 and the rotator 331 connected to the main piston 310 move accordingly and stop at the left position. Conversely, as shown in FIG. 17, only the first port 361 is pressurized, and the compressed air is discharged from the second port 362, whereby the main piston 310 is pushed in the rotation axis positive direction Z (+) of the rotator 331, and the rotator 331 moves accordingly and stop at the right position. Further, as shown in FIG. 15, the first port 361 and the second port 362 are pressurized at the same time, whereby the main piston 310 stops at the center position, and the rotator 331 also stops at the center position accordingly.

Third Embodiment of the Disclosure

Figure 19:
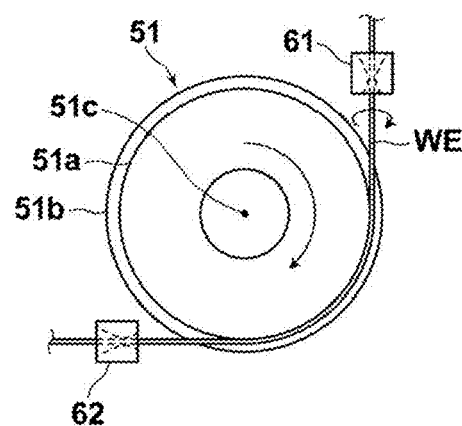
FIG. 19 is a schematic side view showing a main part of a wire electric discharge machine 400 according to a third embodiment of the disclosure.

Next, a wire electric discharge machine according to a third embodiment of the disclosure will be described with reference to FIG. 19 and FIG. 20. Compared with the wire electric discharge machine 100 of the first embodiment, the wire electric discharge machine 400 of this embodiment differs in that a rotator 51 in a circular columnar shape is used instead of the rotator 31 in a drum shape as shown in FIG. 3 and FIG. 4, and in that wire guides 61 and 62 are additionally provided; other configurations are the same as those shown in FIG. 1 and FIG. 2. The rotator 51 includes a winding part 51a, around which the wire electrode WE is wound, and flange parts (brim) 51b disposed on both left and right sides thereof, and the rotator 51 rotates around a rotation shaft 51c. The winding part 51a is in a circular columnar shape having a constant outer diameter over the entire length between the flange parts 51b. The wire electrode WE wound around the winding part 51a is prevented from falling off from the winding part 51a by the flange parts 51b.

Figure 20:
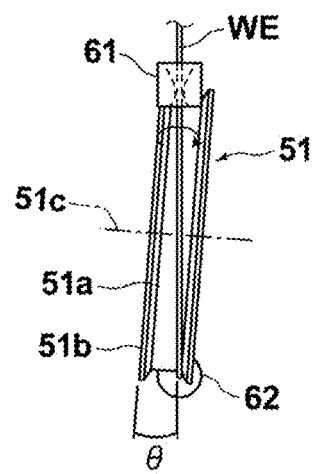
FIG. 20 is a front view of the part shown in FIG. 19.

As shown in FIG. 20, the rotator 51 is disposed so that its rotating shaft 51c is inclined with respect to the horizontal direction, more specifically, so that the perpendicular line of the rotating shaft 51c of the rotator 51 is inclined with respect to the straight line connecting the upper wire guide 4U and the lower wire guide 4L. Further, the positions of the wire electrode WE before and after it is wound around the rotator 51 are defined by the wire guides 61 and 62, respectively. Therefore, as viewed from the horizontal direction, the wire electrode WE is wound around the winding part 51a in a state where the wire electrode WE is inclined with respect to a direction orthogonal to the axial direction of the rotator 51 (the direction in which the rotating shaft 51c extends). Further, this inclination angle θ is preferably in the range of 0.1 to 1.0° (degrees).

Since the wire electrode WE wound around the rotator 51 in such a state receives a force in a direction for rotating itself around the axis when advancing along the rotator 51 that is rotating, the wire electrode WE rotates continuously in this direction. This rotation is also transmitted to the part of the wire electrode WE, which faces the workpiece WP with the machining gap therebetween, further to the upstream side of the wire electrode feed direction than the rotator 51. In this way, in the wire electric discharge machine 400 of this embodiment as well, the wire electrode WE facing the workpiece WP is rotated around the axis, and wire electric discharge machining can be performed by a part of the wire electrode WE that has not been consumed.

Fourth Embodiment of the Disclosure

Figure 21:
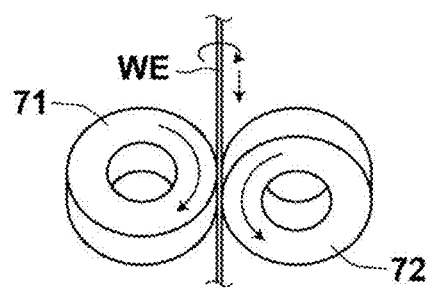
FIG. 21 is a schematic side view showing a main part of a wire electric discharge machine 500 according to a fourth embodiment of the disclosure.

Next, a wire electric discharge machine according to a fourth embodiment of the disclosure will be described with reference to FIG. 21 and FIG. 22. Compared with the wire electric discharge machine 100 of the first embodiment, the wire electric discharge machine 500 of this embodiment differs basically in that a pair of first and second rotators 71 and 72 that are inclined are used instead of the rotator 31 as shown in FIG. 3, FIG. 4 and FIG. 5; other configurations are the same as those shown in FIG. 1 and FIG. 2. Each of the first and second rotators 71 and 72 is a roller having an outer peripheral surface in a circular columnar shape, and rotates around a central axis (not shown in FIG. 21 and FIG. 22) of the rotator. In addition, the first and second rotators 71 and 72 are disposed so as to clamp the wire electrode WE between them in a state where both the direction orthogonal to the central axis direction of the first rotator 71 (the direction indicated by the broken-line arrow in FIG. 22) and the direction orthogonal to the central axis direction of the second rotator 72 (the direction indicated by the solid-line arrow in FIG. 22) are inclined with respect to the wire electrode WE, that is, a state where the perpendicular lines of the rotation axes of the first and second rotators 71 and 72 are each inclined with respect to the straight line connecting the upper wire guide 4U and the lower wire guide 4L within a range of 0.1 to 1.0 (degree).

Further, unlike the rotators 31 and 331 in the first and second embodiments and the rotator 51 in the third embodiment, the first and second rotators 71 and 72 do not change the advancing direction of the wire electrode WE. Instead, for example, the first and second rotators 71 and 72 are provided in a path in which the wire electrode WE advances downward from above, and keep the wire electrode WE advancing downward as it is. In addition, the first and second rotators 71 and 72 may each be driven to rotate by a driving device to make the clamped wire electrode WE travel, or may be driven by another driving device and be driven by the wire electrode WE that is traveling.

Figure 22:
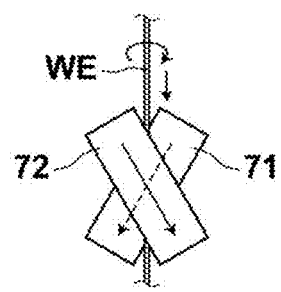
FIG. 22 is a front view of the part shown in FIG. 21.

Since the first and second rotators 71 and 72 are disposed in the above-described state, the parts of the rotators 71 and 72 that are in contact with the wire electrode WE move in the directions indicated by the broken-line arrow and the solid-line arrow, respectively, as shown in FIG. 22 along with the advancing of the wire electrode WE. Thus, since the wire electrode WE receives a force in a direction for rotating itself around the axis when advancing between the first rotator 71 and the second rotator 72, the wire electrode WE rotates continuously in this direction. This rotation is also transmitted to the part of the wire electrode WE, which faces the workpiece WP with the machining gap therebetween, further to the upstream side of the wire electrode feed direction than the first and second rotators 71 and 72. In this way, in the wire electric discharge machine of this embodiment as well, the wire electrode WE facing the workpiece WP is rotated around the axis, and wire electric discharge machining can be performed from the upper surface to the lower surface of the workpiece WP by a part of the wire electrode WE that has not been consumed.

In the first, second, third, and fourth embodiments described above, the device for rotating the wire electrode WE around the axis is disposed on the downstream side in the feed direction of the wire electrode WE with respect to the wire electric discharge machining part, but a device for rotating the wire electrode WE around the axis may be disposed on the upstream side in the feed direction of the wire electrode WE with respect to the wire electric discharge machining part.

What is claimed is:

1. A wire electric discharge machine comprising an upper wire guide and a lower wire guide that stretch a wire electrode therebetween and a rotator that changes a feed direction of the wire electrode, the wire electric discharge machine being configured for machining a workpiece placed between the upper wire guide and the lower wire guide by generating a discharge between the workpiece and the wire electrode, wherein a rotation axis of the rotator is disposed so as to be perpendicular to a straight line connecting the upper wire guide and the lower wire guide, and the rotator is disposed outside of a space in between the upper wire guide and the lower wire guide, and is disposed at a position deviated from the straight line connecting the upper wire guide and the lower wire guide in a rotation axis direction of the rotator, whereby the wire electrode is rotated around an axis.

2. The wire electric discharge machine according to claim 1, wherein the rotator comprises:

a winding part around which the wire electrode is wound; and large diameter parts disposed at two ends of the winding part, wherein a cross section of the outer circumference of the winding part is formed in an arc shape.

3. The wire electric discharge machine according to claim 1, wherein the wire electrode is disposed on an outer peripheral surface of the rotator to be inclined within a range of 0.1 to 1.0° (degrees) with respect to a direction orthogonal to the rotation axis direction of the rotator.

4. The wire electric discharge machine according to claim 1, further comprising a control device and a rotator unit that incorporates the rotator, wherein the rotator unit switches, according to a command from the control device, the rotator at three positions comprising a left position and a right position with respect to the straight line connecting the upper wire guide and the lower wire guide, and a center position on the straight line, thereby changing rotation/non-rotation and a rotation direction of the wire electrode.

5. The wire electric discharge machine according to claim 4, wherein the control device determines a position of the rotator based on information of a machining program of the wire electric discharge machine.

6. A wire electric discharge machine comprising an upper wire guide and a lower wire guide that stretch a wire electrode therebetween and a rotator that changes a feed direction of the wire electrode, the wire electric discharge machine being configured for machining a workpiece placed between the upper wire guide and the lower wire guide by generating a discharge between the workpiece and the wire electrode, wherein the rotator is disposed outside of a space in between the upper wire guide and the lower wire guide, and is disposed so that a perpendicular line of a rotation axis of the rotator is inclined with respect to a straight line connecting the upper wire guide and the lower wire guide, and the wire electrode is disposed on an outer peripheral surface of the rotator, whereby the wire electrode is rotated around an axis.

7. The wire electric discharge machine according to claim 6, wherein the rotator comprises:

a winding part around which the wire electrode is wound; and large diameter parts disposed at two ends of the winding part, wherein the winding part is formed in a circular columnar shape.

8. The wire electric discharge machine according to claim 6, wherein the perpendicular line of the rotation axis of the rotator is disposed to be inclined within a range of 0.1 to 1.0° (degrees) with respect to the straight line connecting the upper wire guide and the lower wire guide.

9. A wire electric discharge machine comprising an upper wire guide and a lower wire guide that stretch a wire electrode therebetween and a pair of rotators that are disposed to clamp the wire electrode, the wire electric discharge machine being configured for machining a workpiece placed between the upper wire guide and the lower wire guide by generating a discharge between the workpiece and the wire electrode, wherein the pair of rotators are disposed outside of a space in between the upper wire guide and the lower wire guide, and are disposed so that perpendicular lines of rotation axes of the rotators are each inclined with respect to a straight line connecting the upper wire guide and the lower wire guide, whereby the wire electrode is rotated around an axis.

10. The wire electric discharge machine according to claim 9, wherein in the pair of rotators, the perpendicular lines of the rotation axes of the rotators are each inclined within a range of 0.1 to 1.0° (degrees) with respect to the straight line connecting the upper wire guide and the lower wire guide.

11. A wire electric discharge machining method for machining a workpiece by generating a discharge between the workpiece and a wire electrode rotating around an axis, wherein as viewed from an upstream side in a feed direction of the wire electrode, when a machining surface of the workpiece is on a right side in a machining advancing direction, a rotation direction of the wire electrode around the axis is set to be counterclockwise, and as viewed from the upstream side in the feed direction of the wire electrode, when a machining surface of the workpiece is on a left side in the machining advancing direction, the rotation direction of the wire electrode around the axis is set to be clockwise.

* * * * *